US012576293B2

(12) United States Patent (10) Patent No.: US 12,576,293 B2
Yamazaki et al. (45) Date of Patent: Mar. 17, 2026

(54) VEHICLE

(71) Applicant: SUBARU CORPORATION, Tokyo (JP)

(72) Inventors: Yoshinobu Yamazaki, Tokyo (JP); Satoshi Uetake, Tokyo (JP); Hisae Sawada, Tokyo (JP); Yuya Aoki, Tokyo (JP); Tokito Kobayashi, Tokyo (JP); Toshiaki Naruke, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 224 days.

(21) Appl. No.: 18/708,447

(22) PCT Filed: Sep. 22, 2022

(86) PCT No.: PCT/JP2022/035524
§ 371 (c)(1),
(2) Date: May 8, 2024

(87) PCT Pub. No.: WO2024/062631
PCT Pub. Date: Mar. 28, 2024

(65) Prior Publication Data
US 2025/0025725 A1 Jan. 23, 2025

(51) Int. Cl.
| *A62C 3/07* | (2006.01) |
| *A62C 3/16* | (2006.01) |
| *B60K 1/04* | (2019.01) |
| *F16K 31/06* | (2006.01) |

(52) U.S. Cl.
CPC .................. *A62C 3/07* (2013.01); *A62C 3/16* (2013.01); *B60K 1/04* (2013.01); *F16K 31/0675* (2013.01); *B60K 2001/0438* (2013.01)

(58) Field of Classification Search
CPC .... A62C 3/00; A62C 3/07; A62C 3/16; A62C 31/28; B60L 58/26; B60K 1/04; B60K 2001/0438; F16K 31/0675
USPC ............................ 169/62, 70; 429/50, 61, 62
See application file for complete search history.

(56) References Cited

U.S. PATENT DOCUMENTS

| 4,047,572 A | * | 9/1977 | Stary | ........................ | A62C 3/00 |
| | | | | | 169/70 |
| 5,036,924 A | * | 8/1991 | Carino | .................... | A62C 31/28 |
| | | | | | 169/70 |
| 5,154,238 A | * | 10/1992 | Buchan | .................... | A62C 3/07 |
| | | | | | 169/62 |
| 11,944,855 B2 | * | 4/2024 | Sjödin | .................... | A62C 35/68 |

(Continued)

FOREIGN PATENT DOCUMENTS

JP          2013-136266 A          7/2013

OTHER PUBLICATIONS

International Search Report received in PCT Application No. PCT/JP2022/035524, dated Dec. 6, 2022.

*Primary Examiner* — Steven J Ganey
(74) *Attorney, Agent, or Firm* — Rimon P.C.

(57) ABSTRACT

A vehicle includes a battery, a battery case accommodating the battery, and a propeller shaft extending in a front-rear direction of the vehicle. The propeller shaft is covered by a propeller shaft case. An internal space of the propeller shaft case communicates with an internal space of the battery case. The vehicle is provided with at least one fire extinguishing hole communicating with the internal space of the propeller shaft case.

12 Claims, 4 Drawing Sheets

(56) References Cited

U.S. PATENT DOCUMENTS

2015/0056481 A1\* 2/2015 Cohen ................. H01M 50/636
429/61
2016/0346573 A1\* 12/2016 Carson ................... A62C 35/62

\* cited by examiner

VEHICLE

CROSS-REFERENCE TO RELATED APPLICATIONS

This application is the U.S. National Phase under 35 U.S.C. § 371 of International Application No. PCT/JP2022/035524, filed on Sep. 22, 2022.

TECHNICAL FIELD

The present invention relates to a vehicle.

BACKGROUND ART

A vehicle such as an electric vehicle including a motor as a drive source is provided with a battery. When a fire of the battery occurs due to a collision load or the like, the battery is to be properly extinguished. For example, PTL 1 discloses a structure for extinguishing the fire of the battery by injecting a fire extinguishing agent into the vehicle from the outside.

CITATION LIST

Patent Literature

PTL 1: Japanese Unexamined Patent Application Publication No. 2013-136266

SUMMARY OF INVENTION

Technical Problem

However, it is assumed that the vehicle is deformed due to the collision load at the time of the fire of the battery. Thus, in some cases, it is difficult to secure a path for supplying the fire extinguishing agent to the battery from the outside of the vehicle. Thus, in some cases, it is difficult to extinguish the fire of the battery by the fire extinguishing agent.

Therefore, an object of the present invention is to provide a vehicle capable of appropriately extinguishing a fire of a battery.

Solution to Problem

In order to solve the above problem, a vehicle according to an aspect of the present invention includes:

a battery;

a battery case accommodating the battery; and a propeller shaft extending in a front-rear direction of the vehicle.

The propeller shaft is covered by a propeller shaft case.

An internal space of the propeller shaft case communicates with an internal space of the battery case.

The vehicle is provided with at least one fire extinguishing hole communicating with the internal space of the propeller shaft case.

ADVANTAGEOUS EFFECTS OF INVENTION

According to the present invention, a fire of the battery can be appropriately extinguished.

DESCRIPTION OF EMBODIMENTS

Figures 1, 2:
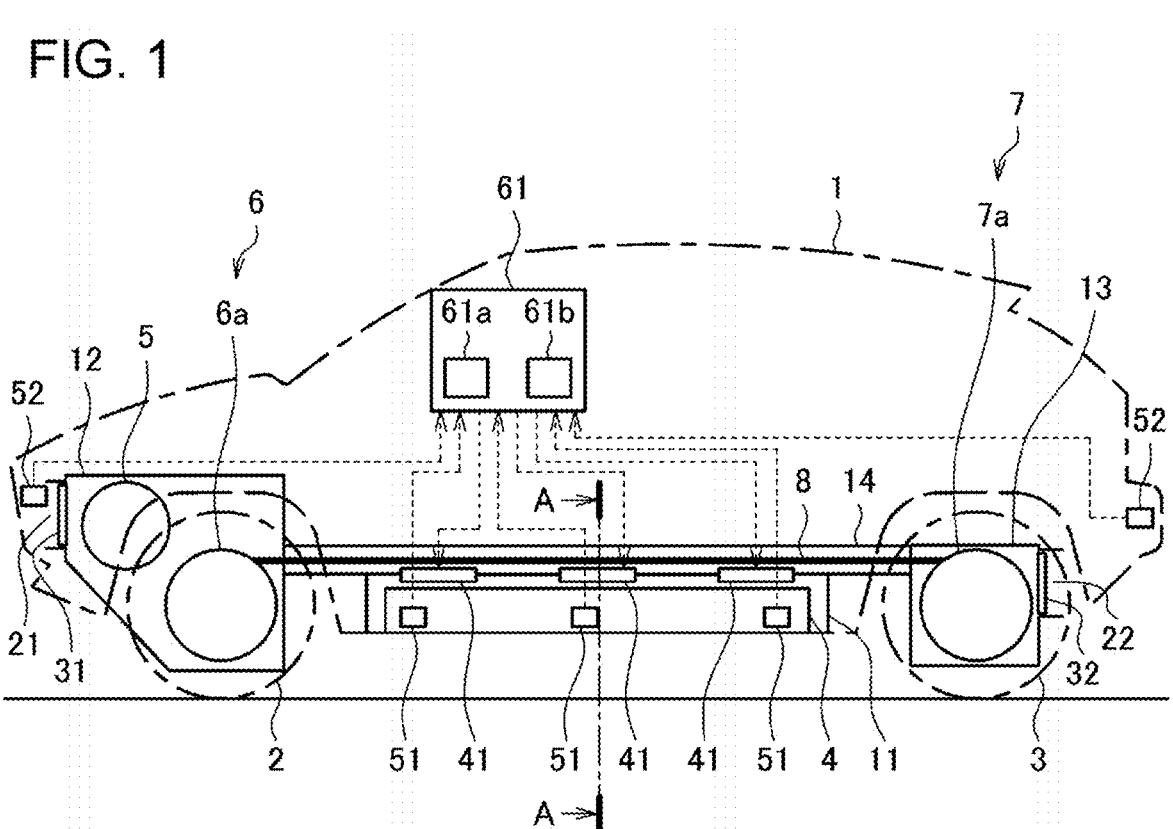
FIG. 1 is a schematic diagram illustrating a schematic configuration of a vehicle according to an embodiment of the present invention.
FIG. 2 is a cross-sectional view taken along line A-A in FIG. 1.

Hereinafter, an embodiment of the present invention will be described in detail with reference to the accompanying drawings. Specific dimensions, materials, numerical values, and the like illustrated in the embodiment are merely examples for facilitating understanding of the invention, and do not limit the present invention unless otherwise specified. In this specification and the drawings, elements having substantially the same functions and configurations are denoted by the same reference numerals to omit redundant description, and elements not directly related to the present invention are not illustrated.

Configuration of Vehicle

A configuration of a vehicle 1 according to the embodiment of the present invention will be described with reference to FIGS. 1 to 3.

Figure 4:
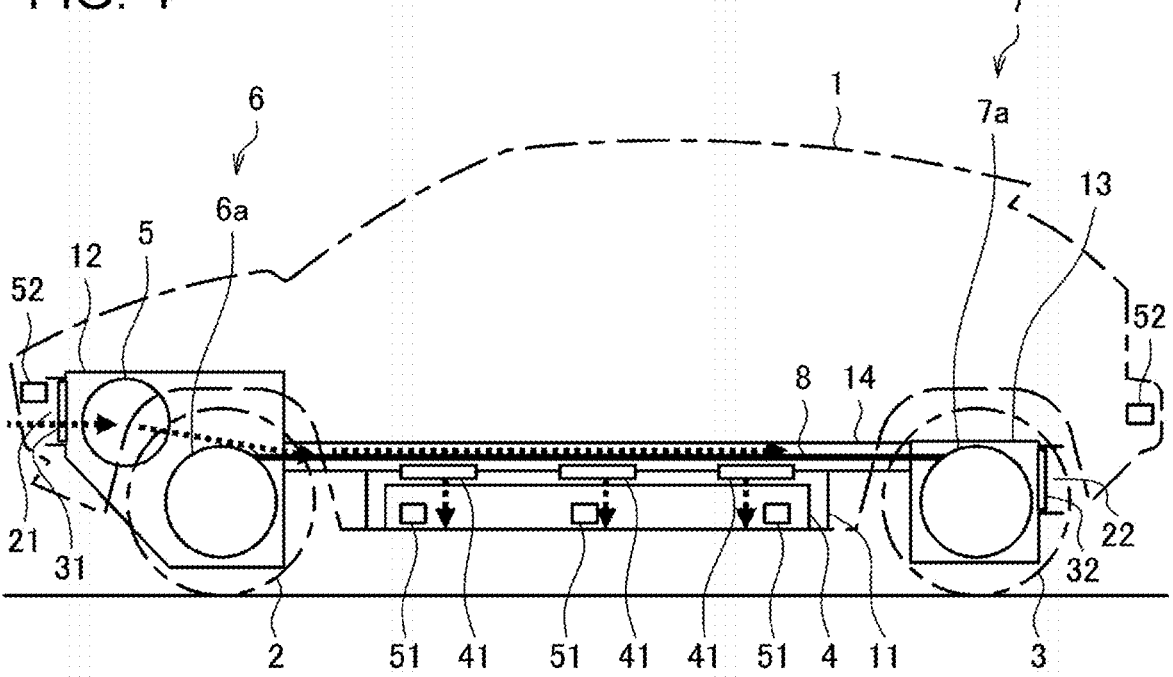
FIG. 4 is a schematic diagram illustrating a path of a fire extinguishing agent injected into a first fire extinguishing hole of the vehicle according to the embodiment of the present invention.
Figure 5:
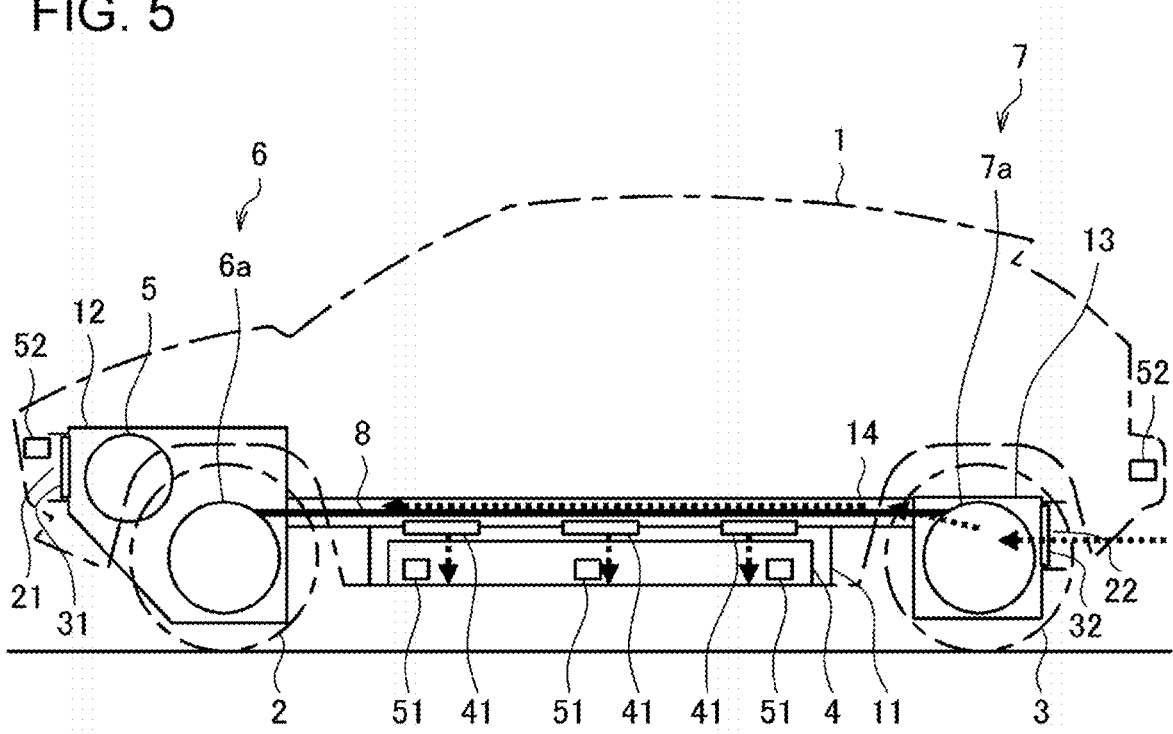
FIG. 5 is a schematic diagram illustrating a path of the fire extinguishing agent injected into a second fire extinguishing hole of the vehicle according to the embodiment of the present invention.

FIG. 1 is a schematic diagram illustrating a schematic configuration of the vehicle 1. The vehicle 1 is an electric vehicle including a motor (for example, a traveling motor 5 in FIG. 1) as a drive source. However, the vehicle 1 may be a vehicle other than the electric vehicle, such as a hybrid vehicle including a motor and an engine as drive sources. As illustrated in FIG. 1, the vehicle 1 includes a pair of left and right front wheels 2, a pair of left and right rear wheels 3, a battery 4, the traveling motor 5, a front wheel drive system 6, a rear wheel drive system 7, and a propeller shaft 8. In FIG. 1 and FIGS. 4 and 5 to be described later, the outline of the vehicle 1 is indicated by the one dot chain line for easy understanding.

The battery 4 stores electric power to be supplied to the traveling motor 5. As the battery 4, for example, a lithium ion battery, a lithium ion polymer battery, a nickel-metal hydride battery, a nickel-cadmium battery, or a lead storage battery is used. However, a battery other than these may be used as the battery 4. The battery 4 is disposed in a lower portion of the vehicle 1. For example, the battery 4 is disposed below the propeller shaft 8.

The traveling motor 5 outputs power for driving the front wheels 2 and the rear wheels 3, which are drive wheels of the vehicle 1. The traveling motor 5 is, for example, a three phase AC motor, and is coupled to the battery 4 via an inverter (not illustrated). The traveling motor 5 is supplied with the electric power from the battery 4. The traveling motor 5 is driven using the electric power supplied from the battery 4.

The front wheel drive system 6 transmits the power output from the traveling motor 5 to the front wheels 2. The front wheel drive system 6 is coupled to the traveling motor 5, and the power is directly transmitted from the traveling motor 5 to the front wheel drive system 6. The front wheel drive system 6 includes, for example, a front differential device 6a. The front wheel drive system 6 includes members (not illustrated) other than the front differential device 6a, such as gears and shafts. The front differential device 6a is coupled to each of the front wheels 2 via a drive shaft. The power transmitted to the front wheel drive system 6 is distributed and transmitted to the front wheels 2 by the front differential device 6a.

The rear wheel drive system 7 transmits the power output from the traveling motor 5 to the rear wheels 3. As will be described later, the power is transmitted from the front wheel drive system 6 to the rear wheel drive system 7 via the propeller shaft 8. The rear wheel drive system 7 includes, for example, a rear differential device 7a. The rear wheel drive system 7 includes members (not illustrated) other than the rear differential device 7a, such as gears and shafts. The rear differential device 7a is coupled to each of the rear wheels 3 via a drive shaft. The power transmitted to the rear wheel drive system 7 is distributed and transmitted to the rear wheels 3 by the rear differential device 7a.

The propeller shaft 8 transmits the power between the front wheel drive system 6 and the rear wheel drive system 7. The propeller shaft 8 extends in the front-rear direction of the vehicle 1 in the lower portion of the vehicle 1. A front end of the propeller shaft 8 is coupled to a gear of the front wheel drive system 6. A rear end of the propeller shaft 8 is coupled to a gear of the rear wheel drive system 7. The power transmitted from the front wheel drive system 6 to the propeller shaft 8 is transmitted to the rear wheel drive system 7 via the propeller shaft 8.

As illustrated in FIG. 1, the vehicle 1 includes a battery case 11, a front wheel drive system case 12, a rear wheel drive system case 13, and a propeller shaft case 14.

The battery case 11 accommodates the battery 4. The battery case 11 is disposed in the lower portion of the vehicle 1 and covers the entire surface of the battery 4.

The front wheel drive system case 12 covers the front wheel drive system 6. The drive shafts coupled to the front wheels 2 protrude to the left and right from the front wheel drive system case 12. In the example in FIG. 1, the traveling motor 5 is covered by the front wheel drive system case 12, but a case that covers the traveling motor 5 may be different from the front wheel drive system case 12.

The rear wheel drive system case 13 covers the rear wheel drive system 7. The drive shafts coupled to the rear wheels 3 protrude to the left and right from the rear wheel drive system case 13.

The propeller shaft case 14 covers the propeller shaft 8. The propeller shaft case 14 extends in the front-rear direction of the vehicle 1 above the battery case 11. The propeller shaft case 14 has a tubular shape and has openings at a front end and a rear end. The propeller shaft 8 protrudes forward and rearward from the propeller shaft case 14.

The front end of the propeller shaft case 14 is coupled to the rear of the front wheel drive system case 12. An internal space of the front wheel drive system case 12 and an internal space of the propeller shaft case 14 communicate with each other via the opening at the front end of the propeller shaft case 14.

The rear end of the propeller shaft case 14 is coupled to the front of the rear wheel drive system case 13. An internal space of the rear wheel drive system case 13 and the internal space of the propeller shaft case 14 communicate with each other via the opening at the rear end of the propeller shaft case 14.

A lower portion of the propeller shaft case 14 is coupled to an upper portion of the battery case 11. In the example in FIG. 1, a portion extending from the front end to the rear end of the upper portion of the battery case 11 is coupled to the propeller shaft case 14. The internal space of the propeller shaft case 14 and an internal space of the battery case 11 communicate with each other via electromagnetic valves 41. In the example in FIG. 1, the three electromagnetic valves 41 arranged at intervals in the front-rear direction of the vehicle 1 are illustrated. However, the number and arrangement of the electromagnetic valves 41 are not limited to the example in FIG. 1. The installation position of each of the electromagnetic valves 41 is a communication part where the internal space of the propeller shaft case 14 and the internal space of the battery case 11 communicate with each other. The electromagnetic valve 41 is driven by using electric power and can be opened and closed.

FIG. 2 is a cross-sectional view taken along line A-A in FIG. 1. As illustrated in FIGS. 1 and 2, the vehicle 1 is provided with a first fire extinguishing hole 21, a second fire extinguishing hole 22, and a third fire extinguishing hole 23 as fire extinguishing holes for injecting a fire extinguishing agent from the outside of the vehicle 1 at the time of a fire of the battery 4. Thus, the fire of the battery 4 can be properly extinguished. However, the number and arrangement of the fire extinguishing holes are not limited to the example illustrated in FIGS. 1 and 2. For example, the number of fire extinguishing holes may be one, two, or four or more. In addition, for example, the fire extinguishing hole may be provided at a position different from the first fire extinguishing hole 21, the second fire extinguishing hole 22, and the third fire extinguishing hole 23.

As illustrated in FIG. 1, the first fire extinguishing hole 21 is provided in the front wheel drive system case 12. The first fire extinguishing hole 21 is an opening that allows the internal space of the front wheel drive system case 12 to communicate with an external space. In the example in FIG. 1, the first fire extinguishing hole 21 is provided in the front of the front wheel drive system case 12. However, the disposition of the first fire extinguishing hole 21 in the front wheel drive system case 12 is not limited to the example in FIG. 1.

The first fire extinguishing hole 21 is provided with a check valve 31. The check valve 31 allows a fluid to flow from the external space to the internal space of the front wheel drive system case 12 via the first fire extinguishing hole 21, and restricts the fluid from flowing from the internal space to the external space of the front wheel drive system case 12 via the first fire extinguishing hole 21.

As illustrated in FIG. 1, the second fire extinguishing hole 22 is provided in the rear wheel drive system case 13. The second fire extinguishing hole 22 is an opening that allows the internal space of the rear wheel drive system case 13 to communicate with the external space. In the example in FIG. 1, the second fire extinguishing hole 22 is provided in the rear of the rear wheel drive system case 13. However, the disposition of the second fire extinguishing hole 22 in the rear wheel drive system case 13 is not limited to the example in FIG. 1.

The second fire extinguishing hole 22 is provided with a check valve 32. The check valve 32 allows a fluid to flow from the external space to the internal space of the rear wheel drive system case 13 via the second fire extinguishing hole 22, and restricts the fluid from flowing from the internal space to the external space of the rear wheel drive system case 13 via the second fire extinguishing hole 22.

As illustrated in FIG. 2, the third fire extinguishing hole 23 is provided on a side (a left side 1*a* in the example of FIG. 2) of the vehicle 1. For example, the third fire extinguishing hole 23 is provided so as to be exposed on the left side 1*a* of the body of the vehicle 1. The battery case 11 and the propeller shaft case 14 are disposed below a bottom 42 of a cabin. The propeller shaft case 14 and the third fire extinguishing hole 23 are coupled to each other via a pipe 43. The pipe 43 extends laterally from a side of the propeller shaft case 14. The third fire extinguishing hole 23 is an opening on the left side 1*a* of the pipe 43. The internal space of the propeller shaft case 14 and the third fire extinguishing hole 23 communicate with each other via the pipe 43.

A check valve 33 is provided at a portion where the propeller shaft case 14 and the pipe 43 are coupled to each other. The check valve 33 allows a fluid to flow from the internal space of the pipe 43 to the internal space of the propeller shaft case 14, and restricts the fluid from flowing from the internal space of the propeller shaft case 14 to the internal space of the pipe 43.

As described above, the first fire extinguishing hole 21, the second fire extinguishing hole 22, and the third fire extinguishing hole 23 communicate with the internal space of the propeller shaft case 14. The internal space of the propeller shaft case 14 communicates with the internal space of the battery case 11. Therefore, the first fire extinguishing hole 21, the second fire extinguishing hole 22, and the third fire extinguishing hole 23 communicate with the internal space of the battery case 11 via the internal space of the propeller shaft case 14. Thus, as will be described later, the fire extinguishing agent injected into each of the fire extinguishing holes 21, 22, and 23 is supplied to the internal space of the battery case 11.

As illustrated in FIG. 1, the vehicle 1 includes temperature sensors 51, load sensors 52, and a control device 61.

The temperature sensors 51 detect the temperature of the battery 4. In the example in FIG. 1, the three temperature sensors 51 arranged at intervals in the front-rear direction of the vehicle 1 are illustrated. However, the number and arrangement of the temperature sensors 51 are not limited to the example in FIG. 1. Each of the temperature sensors 51 detects the temperature of the battery 4 at the installation position.

The load sensors 52 detect a collision load input to the vehicle 1. In the example in FIG. 1, the two load sensors 52 provided at the front end and the rear end of the vehicle 1 are illustrated. However, the number and arrangement of the load sensors 52 are not limited to the example in FIG. 1. Each of the load sensors 52 detects the collision load at the installation position.

The control device 61 includes one or more processors 61*a* and one or more memories 61*b* coupled to the one or more processors 61*a*. The one or more processors 61*a* include, for example, a central processing unit (CPU). The one or more memories 61*b* include, for example, a read only memory (ROM), a random access memory (RAM), and the like. The ROM is a storage element that stores programs, operation parameters, and the like used by the CPU. The RAM is a storage element that temporarily stores data such as variables and parameters used for processing executed by the CPU.

The control device 61 communicates with the devices in the vehicle 1 such as the electromagnetic valves 41, the temperature sensors 51, and the load sensors 52. Communication between the control device 61 and the devices is implemented by using, for example, controller area network (CAN) communication.

Figure 3:
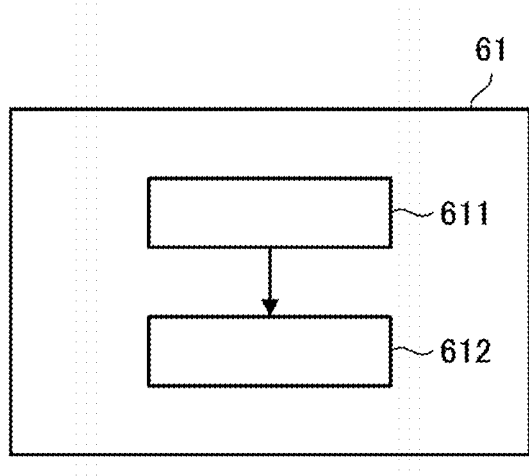
FIG. 3 is a block diagram illustrating an example of a functional configuration of a control device according to the embodiment of the present invention.

FIG. 3 is a block diagram illustrating an example of a functional configuration of the control device 61. For example, as illustrated in FIG. 3, the control device 61 includes an acquirer 611 and a controller 612. Note that various kinds of processing including the processing described below performed by the acquirer 611 or the controller 612 may be executed by the one or more processors 61*a*. For example, the one or more processors 61*a* execute a program stored in the one or more memories 61*b* to perform various kinds of processing.

The acquirer 611 acquires various kinds of information and outputs the information to the controller 612. For example, the acquirer 611 acquires information from the temperature sensors 51 and the load sensors 52.

The controller 612 controls opening/closing operations of the electromagnetic valves 41. For example, the controller 612 independently controls the opening/closing operations of the respective electromagnetic valves 41. An open state of the electromagnetic valve 41 is a state in which the internal space of the propeller shaft case 14 and the internal space of the battery case 11 are not blocked by the electromagnetic valve 41 at the installation position of the electromagnetic valve 41. A closed state of the electromagnetic valve 41 is a state in which the internal space of the propeller shaft case 14 and the internal space of the battery case 11 are blocked by the electromagnetic valve 41 at the installation position of the electromagnetic valve 41.

Operation of Vehicle

Next, an operation of the vehicle 1 according to the embodiment of the present invention will be described with reference to FIGS. 4 to 8.

As will be described later, the controller 612 of the control device 61 opens one or more of the electromagnetic valves 41 if a specific condition is satisfied, and opens all of the electromagnetic valves 41 if the specific condition is not satisfied. However, the controller 612 may close all of the electromagnetic valves 41 if the specific condition is not satisfied. In addition, the controller 612 may open all of the electromagnetic valves 41 regardless of whether the specific condition is satisfied.

Figure 6:
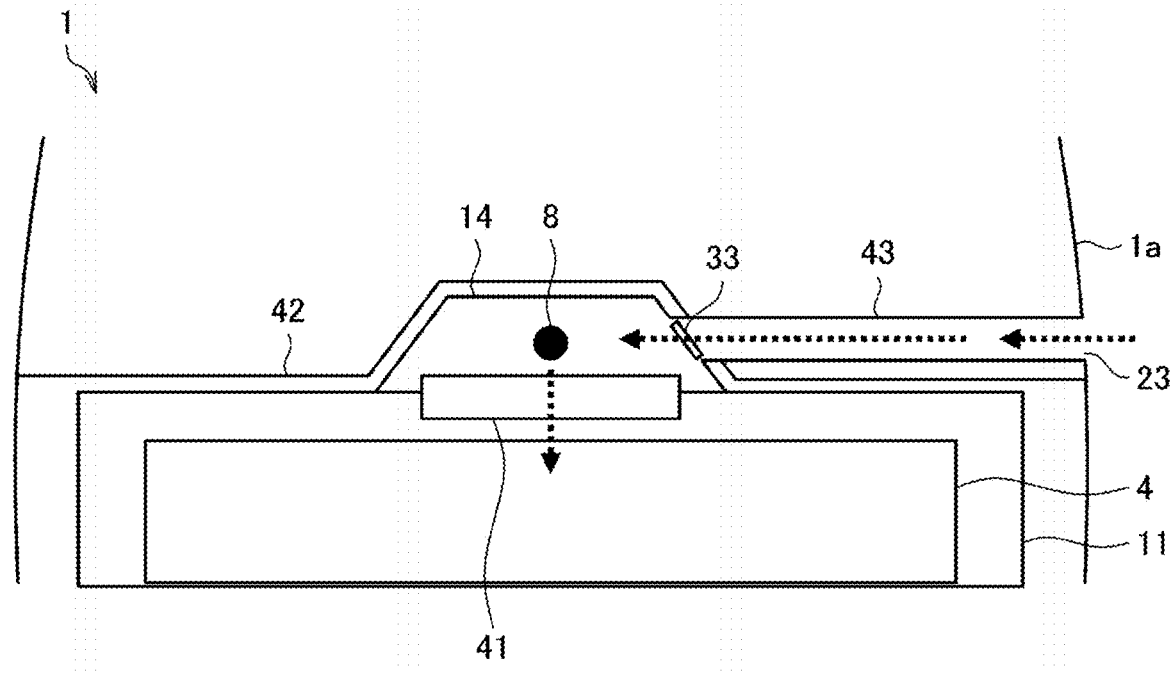
FIG. 6 is a schematic diagram illustrating a path of the fire extinguishing agent injected into a third fire extinguishing hole of the vehicle according to the embodiment of the present invention.

A path of the fire extinguishing agent injected into each of the fire extinguishing holes 21, 22, and 23 will be described below with reference to FIGS. 4 to 6. In FIGS. 4 to 6, the path of the fire extinguishing agent is indicated by the dashed arrow. FIGS. 4 to 6 illustrate a case where all of the electromagnetic valves 41 are in the open state.

FIG. 4 is a schematic diagram illustrating the path of the fire extinguishing agent injected into the first fire extinguishing hole 21. The first fire extinguishing hole 21 communicates with the internal space of the battery case 11 via the internal space of the front wheel drive system case 12 and the internal space of the propeller shaft case 14. The fire extinguishing agent injected into the first fire extinguishing hole 21 is sent to the internal space of the propeller shaft case 14 via the internal space of the front wheel drive system case 12. Subsequently, the fire extinguishing agent sent to the internal space of the propeller shaft case 14 passes through the internal space of the propeller shaft case 14, and is sent to the internal space of the battery case 11 through the communication parts, which are the installation positions of the electromagnetic valves 41.

FIG. 5 is a schematic diagram illustrating the path of the fire extinguishing agent injected into the second fire extinguishing hole 22. The second fire extinguishing hole 22 communicates with the internal space of the battery case 11 via the internal space of the rear wheel drive system case 13 and the internal space of the propeller shaft case 14. The fire extinguishing agent injected into the second fire extinguishing hole 22 is sent to the internal space of the propeller shaft case 14 via the internal space of the rear wheel drive system case 13. Subsequently, the fire extinguishing agent sent to the internal space of the propeller shaft case 14 passes through the internal space of the propeller shaft case 14, and is sent to the internal space of the battery case 11 through the communication parts, which are the installation positions of the electromagnetic valves 41.

FIG. 6 is a schematic diagram illustrating the path of the fire extinguishing agent injected into the third fire extinguishing hole 23. The third fire extinguishing hole 23 communicates with the internal space of the battery case 11 via the pipe 43 and the internal space of the propeller shaft case 14. The fire extinguishing agent injected into the third fire extinguishing hole 23 is sent to the internal space of the propeller shaft case 14 through the pipe 43. Subsequently, the fire extinguishing agent sent to the internal space of the propeller shaft case 14 passes through the internal space of the propeller shaft case 14, and is sent to the internal space of the battery case 11 through the communication parts, which are the installation positions of the electromagnetic valves 41.

As described above, in the vehicle 1, the fire extinguishing agent injected into each of the fire extinguishing holes 21, 22, and 23 is sent to the internal space of the battery case 11 via the internal space of the propeller shaft case 14. In this manner, in the vehicle 1, the internal space of the propeller shaft case 14 is used as the path for supplying the fire extinguishing agent to the battery 4 from the outside of the vehicle 1. Here, it is assumed that the vehicle 1 is deformed by the collision load at the time of the fire of the battery 4. However, since a frame member is disposed around the propeller shaft case 14, it is difficult to transmit the collision load to the propeller shaft case 14. Therefore, the propeller shaft case 14 is less likely to be deformed. Accordingly, by using the internal space of the propeller shaft case 14 as the path of the fire extinguishing agent, the fire extinguishing agent injected into each of the fire extinguishing holes 21, 22, and 23 can be appropriately supplied to the internal space of the battery case 11. Thus, the fire of the battery 4 can be appropriately extinguished.

Figure 7:
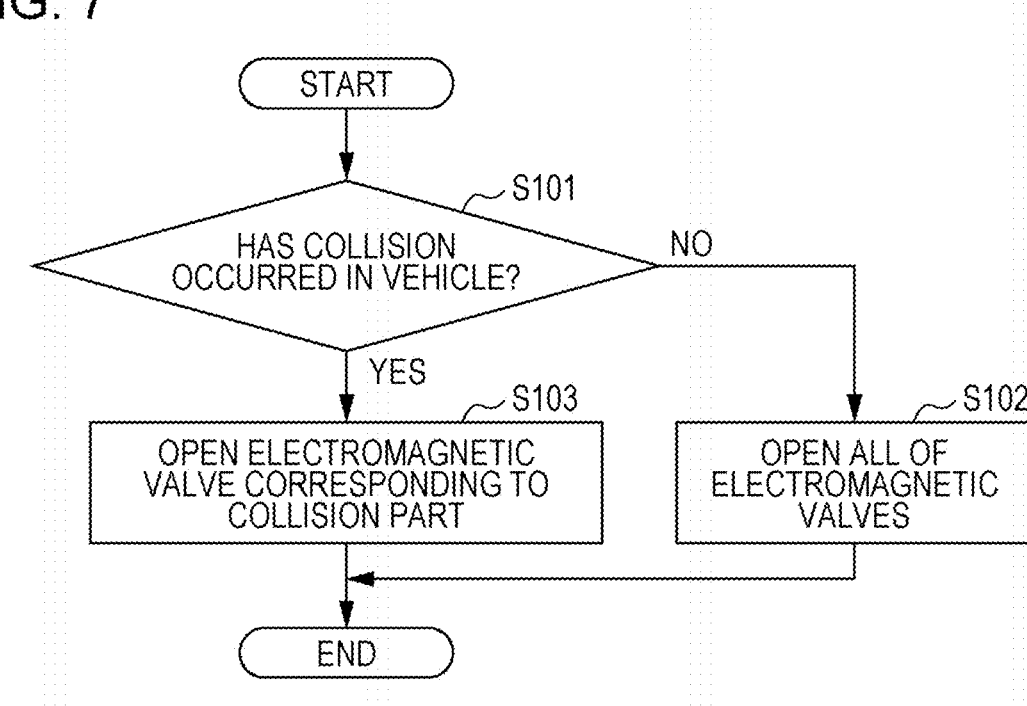
FIG. 7 is a flowchart illustrating a flow of a first processing example performed by the control device according to the embodiment of the present invention.
Figure 8:
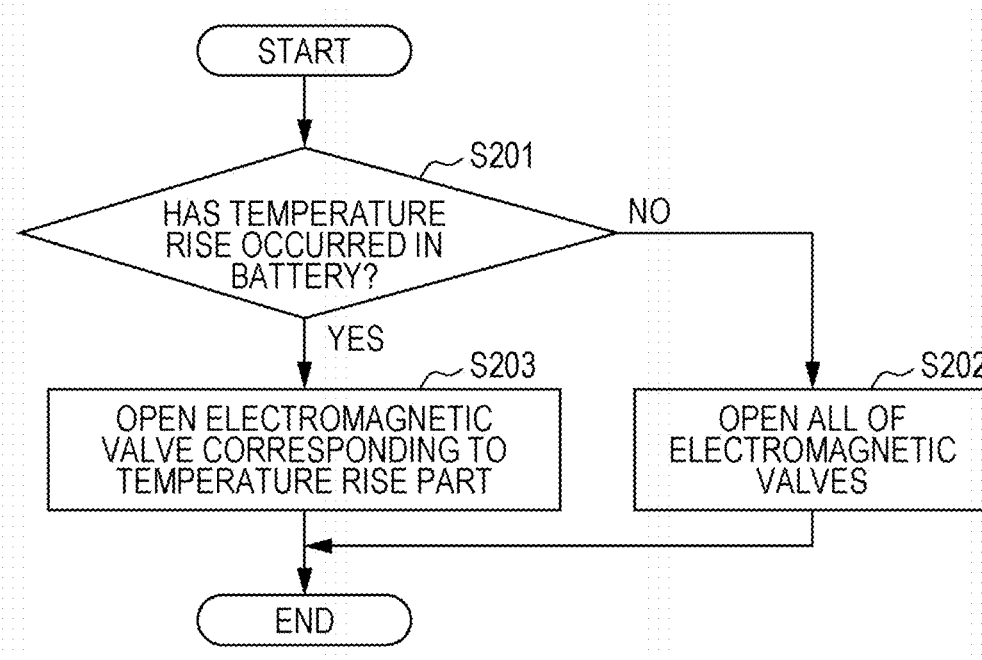
FIG. 8 is a flowchart illustrating a flow of a second processing example performed by the control device according to the embodiment of the present invention.

Now, with reference to FIGS. 7 and 8, a first processing example and a second processing example will be sequentially described as processing examples related to opening/closing control of the electromagnetic valves 41 performed by the controller 612 of the control device 61.

FIG. 7 is a flowchart illustrating a flow of the first processing example performed by the control device 61. The control flow illustrated in FIG. 7 is repeated, for example, at preset time intervals.

At the start of the control flow illustrated in FIG. 7, first, in step S101, the controller 612 determines whether a collision has occurred in the vehicle 1. The determination in step S101 is performed, for example, based on detection results of the load sensors 52. For example, the controller 612 determines that the collision has occurred in the vehicle 1 if the collision load input to the vehicle 1 is larger than a reference value.

If it is determined that no collision has occurred in the vehicle 1 (if NO determination is made in step S101), the process proceeds to step S102. In step S102, the controller 612 opens all of the electromagnetic valves 41. Subsequently to step S102, the control flow illustrated in FIG. 7 ends.

On the other hand, if it is determined that the collision has occurred in the vehicle 1 (if YES determination is made in step S101), the process proceeds to step S103. In step S103, the controller 612 opens the electromagnetic valve 41 corresponding to a collision part, and closes the other electromagnetic valves 41. Subsequently to step S103, the control flow illustrated in FIG. 7 ends. The collision part means a part where the collision has occurred in the vehicle 1.

In step S103, for example, the controller 612 specifies the collision part, based on the detection results of the load sensors 52. For example, if the collision load detected by the load sensor 52 on the front side is larger than the reference value, the controller 612 specifies that the collision part is the front of the vehicle 1. In this case, the controller 612 opens the front electromagnetic valve 41 among the three electromagnetic valves 41, and closes the central and rear electromagnetic valves 41. However, the controller 612 may open the central electromagnetic valve 41 in addition to the front electromagnetic valve 41 among the three electromagnetic valves 41.

On the other hand, if the collision load detected by the load sensor 52 on the rear side is larger than the reference value, the controller 612 specifies that the collision part is the rear of the vehicle 1. In this case, the controller 612 opens the rear electromagnetic valve 41 among the three electromagnetic valves 41, and closes the central and front electromagnetic valves 41. However, the controller 612 may open the central electromagnetic valve 41 in addition to the rear electromagnetic valve 41 among the three electromagnetic valves 41.

As described above, in the first processing example, the controller 612 controls the opening/closing operations of the electromagnetic valves 41, based on the information on the collision of the vehicle 1 (in the above example, the detection results of the load sensors 52). Thus, by opening the electromagnetic valve 41 close to the collision part, the fire extinguishing agent can be intensively supplied to the part of the battery 4 where the fire has occurred due to the collision load or the part where the fire is likely to occur. Therefore, the battery 4 can be extinguished more appropriately.

FIG. 8 is a flowchart illustrating a flow of the second processing example performed by the control device 61. The control flow illustrated in FIG. 8 is repeated, for example, at preset time intervals.

At the start of the control flow illustrated in FIG. 8, first, in step S201, the controller 612 determines whether a temperature rise has occurred in the battery 4. The temperature rise in the battery 4 means a large temperature rise to such an extent that the battery 4 is to be extinguished. The determination in step S201 is performed, for example, based on detection results of the temperature sensors 51. For example, if the temperature of the battery 4 detected by any one of the temperature sensors 51 is higher than a reference value, the controller 612 determines that the temperature rise has occurred in the battery 4.

If it is determined that no temperature rise has occurred in the battery 4 (if NO determination is made in step S201), the process proceeds to step S202. In step S202, the controller 612 opens all of the electromagnetic valves 41. Subsequently to step S202, the control flow illustrated in FIG. 8 ends.

On the other hand, if it is determined that the temperature rise has occurred in the battery 4 (if YES determination is made in step S201), the process proceeds to step S203. In step S203, the controller 612 opens the electromagnetic valve 41 corresponding to a temperature rise part, and closes the other electromagnetic valves 41. Subsequently to step S203, the control flow illustrated in FIG. 8 ends. The temperature rise part means a part where the temperature rise has occurred in the battery 4.

In step S203, for example, the controller 612 specifies the temperature rise part, based on the detection results of the temperature sensors 51. For example, if the temperature detected by the temperature sensor 51 on the front side is higher than the reference value, the controller 612 specifies that the temperature rise part is the front of the battery 4. In this case, the controller 612 opens the front electromagnetic valve 41 among the three electromagnetic valves 41, and closes the central and rear electromagnetic valves 41. However, the controller 612 may open the central electromagnetic valve 41 in addition to the front electromagnetic valve 41 among the three electromagnetic valves 41.

On the other hand, if the temperature detected by the temperature sensor 51 on the rear side is higher than the reference value, the controller 612 specifies that the temperature rise part is the rear of the battery 4. In this case, the controller 612 opens the rear electromagnetic valve 41 among the three electromagnetic valves 41, and closes the central and front electromagnetic valves 41. However, the controller 612 may open the central electromagnetic valve 41 in addition to the rear electromagnetic valve 41 among the three electromagnetic valves 41.

As described above, in the second processing example, the controller 612 controls the opening/closing operations of the electromagnetic valves 41, based on the information on the temperature of the battery 4 (in the above example, the detection results of the temperature sensors 51). Thus, by opening the electromagnetic valve 41 close to the temperature rise part, the fire extinguishing agent can be intensively supplied to the part of the battery 4 where the fire has occurred or the part where the fire is likely to occur. Therefore, the battery 4 can be extinguished more appropriately.

The first processing example in which the opening/closing operations of the electromagnetic valves 41 are controlled based on the information on the collision in the vehicle 1 and the second processing example in which the opening/closing operations of the electromagnetic valves 41 are controlled based on the information on the temperature of the battery 4 have been described above. However, the controller 612 may control the opening/closing operations of the electromagnetic valves 41 in consideration of both the information on the collision of the vehicle 1 and the information on the temperature of the battery 4.

Effects of Vehicle

Next, effects of the vehicle 1 according to the embodiment of the present invention will be described.

The vehicle 1 according to the present embodiment includes the battery 4, the battery case 11 accommodating the battery 4, and the propeller shaft 8 extending in the front-rear direction of the vehicle 1. The propeller shaft 8 is covered by the propeller shaft case 14. The internal space of the propeller shaft case 14 communicates with the internal space of the battery case 11. The vehicle is provided with at least one fire extinguishing hole (in the above example, the first fire extinguishing hole 21, the second fire extinguishing hole 22, and the third fire extinguishing hole 23) communicating with the internal space of the propeller shaft case 14. Accordingly, the fire extinguishing agent injected into the fire extinguishing hole may be sent to the internal space of the battery case 11 via the internal space of the propeller shaft case 14. In this manner, in the vehicle 1, the internal space of the propeller shaft case 14, which is unlikely to deform by the collision load, is used as the path for supplying the fire extinguishing agent to the battery 4 from the outside of the vehicle 1. Therefore, since the fire extinguishing agent injected into the fire extinguishing hole can be appropriately supplied to the internal space of the battery case 11, the fire of the battery 4 can be appropriately extinguished. Furthermore, by effectively using the propeller shaft case 14 as the path of the fire extinguishing agent, an increase in the number of additional members can be suppressed.

In the vehicle 1 according to the present embodiment, the internal space of the propeller shaft case 14 and the internal space of the battery case 11 may communicate with each other at communication parts. The vehicle may include the electromagnetic valves 41 each provided at a corresponding one of the communication parts, and the control device 61 including the one or more processors 61a and the one or more memories 61b coupled to the one or more processors 61a. The one or more processors 61a may be configured to execute a process including controlling the opening/closing operations of the electromagnetic valves 41. Thus, the fire extinguishing agent can be intensively supplied to the part of the battery 4 where the fire has occurred. Therefore, the battery 4 can be extinguished more appropriately.

In addition, in the vehicle 1 according to the present embodiment, the one or more processors 61a may be configured to execute the process including controlling the opening/closing operations of the electromagnetic valves 41, based on the information on the collision in the vehicle 1. Thus, the fire extinguishing agent can be intensively supplied to the part of the battery 4 where the fire has occurred due to the collision load or the part where the fire is likely to occur. Therefore, the battery 4 is more appropriately extinguished.

In the vehicle 1 according to the present embodiment, the one or more processors 61a may be configured to execute the process including controlling the opening/closing operations of the electromagnetic valves 41, based on the information on the temperature of the battery 4. Thus, the fire extinguishing agent can be intensively supplied to the high-temperature part of the battery 4 where the fire has occurred or the part where the fire is likely to occur. Therefore, the battery 4 is appropriately extinguished.

In addition, in the vehicle 1 according to the present embodiment, the at least one fire extinguishing hole may include fire extinguishing holes (in the above example, the first fire extinguishing hole 21, the second fire extinguishing hole 22, and the third fire extinguishing hole 23) arranged at mutually different positions. Thus, even if the vehicle 1 is deformed by the collision load and it is not possible to use one of the fire extinguishing holes, the fire extinguishing agent can be supplied to the internal space of the battery case 11 by using another fire extinguishing hole. For example, if the front of the vehicle 1 is the collision part and it is not possible to use the first fire extinguishing hole 21, the second fire extinguishing hole 22 or the third fire extinguishing hole 23 can be used. In addition, for example, if the rear of the vehicle 1 is the collision part and it is not possible to use the second fire extinguishing hole 22, the first fire extinguishing hole 21 or the third fire extinguishing hole 23 can be used. Furthermore, for example, if the side of the vehicle 1 is the collision part and it is not possible to use the third fire extinguishing hole 23, the first fire extinguishing hole 21 or the second fire extinguishing hole 22 can be used.

In addition, in the vehicle 1 according to the present embodiment, the at least one fire extinguishing hole may include the first fire extinguishing hole 21 provided in the front wheel drive system case 12 covering the front wheel drive system 6 of the vehicle 1. Thus, at the time of the fire of the battery 4, the fire extinguishing agent can be injected from the front of the vehicle 1. Therefore, if the rear or the side of the vehicle 1 is the collision part, the fire extinguishing agent can be appropriately supplied to the internal space of the battery case 11.

In addition, in the vehicle 1 according to the present embodiment, the at least one fire extinguishing hole may include the second fire extinguishing hole 22 provided in the rear wheel drive system case 13 covering the rear wheel drive system 7 of the vehicle 1. Thus, at the time of the fire of the battery 4, the fire extinguishing agent can be injected from the rear of the vehicle 1. Therefore, if the front or the side of the vehicle 1 is the collision part, the fire extinguishing agent can be appropriately supplied to the internal space of the battery case 11.

In addition, in the vehicle 1 according to the present embodiment, the at least one fire extinguishing hole may include the third fire extinguishing hole 23 provided on a side (in the above example, the left side 1a) of the vehicle 1. Thus, at the time of the fire of the battery 4, the fire extinguishing agent can be injected from the side of the vehicle 1. Therefore, if the front or the rear of the vehicle 1 is the collision part, the fire extinguishing agent can be appropriately supplied to the internal space of the battery case 11.

The preferable embodiment of the present invention has been described above with reference to the appended drawings. However, it is to be understood that the present invention is not limited to the above described embodiment. It is to be understood that various changes and modifications within the claims fall within the technical scope of the present invention.

For example, the schematic configuration of the vehicle 1 has been described above with reference to FIGS. 1 and 2. However, components of the vehicle 1 may be added, deleted, or changed as appropriate in the above example. For example, in the above example, the traveling motor 5 is disposed in the front of the vehicle 1, but the traveling motor 5 may be disposed in the rear of the vehicle 1. In addition, for example, in the example in FIG. 2, the cross-sectional shape of the propeller shaft case 14 is a trapezoidal shape, but the cross-sectional shape of the propeller shaft case 14 may be a circular shape, an elliptical shape, or the like.

Furthermore, for example, the processes described with reference to the flowcharts in the present specification may not necessarily be executed in the order illustrated in the flowcharts. Also, additional processing steps may be employed, and some processing steps may be omitted.

REFERENCE SIGNS LIST 1 vehicle
1a left side (side)
2 front wheel
3 rear wheel
4 battery
5 traveling motor
6 front wheel drive system
6a front differential device
7 rear wheel drive system
7a rear differential device
8 propeller shaft
11 battery case
12 front wheel drive system case
13 rear wheel drive system case
14 propeller shaft case
21 first fire extinguishing hole (fire extinguishing hole)
22 second fire extinguishing hole (fire extinguishing hole)
23 third fire extinguishing hole (fire extinguishing hole)
31 check valve
32 check valve
33 check valve
41 electromagnetic valve
42 bottom
43 pipe
51 temperature sensor
52 load sensor
61 control device
61a processor
61b memory
611 acquirer
612 control unit

The invention claimed is:

1. A vehicle comprising:
a battery;
a battery case accommodating the battery; and
a propeller shaft extending in a front-rear direction of the vehicle, wherein
the propeller shaft is covered by a propeller shaft case,
an internal space of the propeller shaft case communicates with an internal space of the battery case, and
the vehicle is provided with at least one fire extinguishing hole communicating with the internal space of the propeller shaft case.

2. The vehicle according to claim 1, wherein
the internal space of the propeller shaft case and the internal space of the battery case communicate with each other at communication parts,
the vehicle comprises:
electromagnetic valves each provided at a corresponding one of the communication parts; and
a control device comprising one or more processors and one or more memories coupled to the one or more processors, and
the one or more processors are configured to execute a process including controlling opening/closing operations of the electromagnetic valves.

3. The vehicle according to claim 2, wherein
the one or more processors are configured to execute the process including controlling the opening/closing operations of the electromagnetic valves, based on information on a collision in the vehicle.

4. The vehicle according to claim 3, wherein
the one or more processors are configured to execute the process including controlling the opening/closing operations of the electromagnetic valves, based on information on a temperature of the battery.

5. The vehicle according to claim 2, wherein
the one or more processors are configured to execute the process including controlling the opening/closing operations of the electromagnetic valves, based on information on a temperature of the battery.

6. The vehicle according to claim 1, wherein
the at least one fire extinguishing hole comprises fire extinguishing holes arranged at mutually different positions.

7. The vehicle according to claim 6, wherein
the at least one fire extinguishing hole comprises a first fire extinguishing hole provided in a front wheel drive system case covering a front wheel drive system of the vehicle.

8. The vehicle according to claim 6, wherein
the at least one fire extinguishing hole comprises a second fire extinguishing hole provided in a rear wheel drive system case covering a rear wheel drive system of the vehicle.

9. The vehicle according to claim 6, wherein
the at least one fire extinguishing hole comprises a third fire extinguishing hole provided on a side of the vehicle.

10. The vehicle according to claim 1, wherein
the at least one fire extinguishing hole comprises a first fire extinguishing hole provided in a front wheel drive system case covering a front wheel drive system of the vehicle.

11. The vehicle according to claim 1, wherein
the at least one fire extinguishing hole comprises a second fire extinguishing hole provided in a rear wheel drive system case covering a rear wheel drive system of the vehicle.

12. The vehicle according to claim 1, wherein
the at least one fire extinguishing hole comprises a third fire extinguishing hole provided on a side of the vehicle.

* * * * *